United States Patent [19]
Austin

[11] Patent Number: 6,019,674
[45] Date of Patent: Feb. 1, 2000

[54] TWO STEP POULTRY STUNNING METHOD AND APPARATUS THEREFOR

[75] Inventor: Wayne Austin, Alpharettu, Ga.

[73] Assignee: SEC, Inc, Dallas, Ga.

[21] Appl. No.: 09/201,915

[22] Filed: Nov. 30, 1998

[51] Int. Cl.[7] .................................................. A22C 21/00
[52] U.S. Cl. .............................................. 452/59; 452/58
[58] Field of Search ........................................ 452/59, 58

[56] References Cited

U.S. PATENT DOCUMENTS

| | | | |
|---|---|---|---|
| 3,474,490 | 10/1969 | Groover et al. | 452/59 |
| 3,564,645 | 2/1971 | Brugman | 452/59 |
| 3,828,397 | 8/1974 | Harben, Jr. | 452/59 |
| 3,857,138 | 12/1974 | McWhirter | 452/59 |
| 4,153,971 | 5/1979 | Simonds | 452/59 |
| 4,694,534 | 9/1987 | Simmons | 452/22 |
| 5,512,014 | 4/1996 | Burnett | 452/58 |

*Primary Examiner*—Willis Little
*Attorney, Agent, or Firm*—Eric P. Schellin

[57] ABSTRACT

The present invention provides a saline solution containing elongated trough which is mounted at the end portions of four non-electrically conducting posts. The trough has an ingress funnel arrangement designed to restrict the thrashing of to-be-electrically stunned birds and an elongated grid having a portion immersed in the solution and a downstream portion out of the solution. The four posts extend upwardly and terminate in threaded portions. A frame carriage is provided which has four corners and at the four corners are suitably mounted driven gears with internal bores and threads adapted to engagingly rotate about the threaded portions of the posts. The carriage is suitably affixed to a conventional I-beam to which is movingly mounted a conventional endless cable and spaced shackle system for conveying upside down birds. The four mounted gears are driven rotatably in unison by a chain drive whereby the trough may be selectively moved upwardly or downwardly to vary the distance between the I-beam and the trough. A continuing extension trough is located and positioned at the end of the trough which has a relatively smooth bottom through which an additional and different pulsating electrical current can be applied to the head of the bird.

2 Claims, 6 Drawing Sheets

TWO STEP POULTRY STUNNING METHOD AND APPARATUS THEREFOR

BACKGROUND OF THE INVENTION

A one step stunner method and apparatus therefor is disclosed in U.S. Pat. No. 4,694,534 to Lacy Simmons. The said patent is incorporated herein its entirety by reference.

The present invention is a modified version of the stunner of said patent. The stunner of Simmons operates with a pulsating low DC voltage. The lower voltage, usually in the 10–14 volt range for chickens, 14–18 volts for small turkeys, and 30–35 volts for larger turkeys. These voltages work very well for most processors; but are not acceptable for those localities requiring a "stun-to-kill".

In general, most stunners used outside North America are based upon a design developed in Western Europe. These European stunners operate as "water bath" stunners. This means that the birds's heads and necks are dragged through a tank of electrically charged water. This results in a very inconsistent stun, and, when combined with European style killing machines which cut only one side of the bird's neck, results in birds still being alive when reaching the scalder. This is the main reason that many European countries now require the "stun-to-kill" practice.

However, when a bird is killed in a stunner with electrical current, there is a very strong possibility of causing damage to the carcass such as broken bones and hemorrhaging of blood vessels. Poultry processors have been looking for alternative stunning methods to improve the "stun-to-kill" procedure so that the birds can be stunned with less resulting product damage.

SUMMARY OF THE INVENTION

Salutary results have been obtained by using the Simmons stunner of the said patent wherein low 15 to 30 volts pulsating DC is connected to the grate and low above 30 volts AC connected to a trough extension which is bolted to the end of the Simmons stunner. Two to three seconds of the higher voltage AC is adequate, although it is contemplated that higher AC voltages and longer dwell times may be necessary.

BRIEF DESCRIPTION OF THE INVENTION

The present invention provides a saline solution contained in an elongated trough which is mounted at the end portions of four non-electronically conducting posts. The trough has an ingress funnel arrangement designed to control the thrashing of to-be-electrically stunned birds and an elongated grid having a portion immersed in the solution and a downstream portion out of the solution. The four posts extend upwardly and terminate in threaded portions. A frame carriage is provided which has four corners and at the four corners are suitably mounted driven gears with internal bores and threads adapted to engagingly rotate about the threaded portions of the ports. The carriage is suitably affixed to a conventional I-beam to which is movingly mounted a conventional endless cable and space shackle system for conveying birds in an upside down manner. The four mounted gears are rotatable in unison by a chain drive which may be manual, hydraulic or electric whereby the trough may be selectively moved upwardly or downwardly as found necessary to vary the distance between the said I-beam and said trough to accommodate different sized shackles and/or birds.

The trough has a short extension bolted thereto to provide a second section through which and across the bottom thereof the bird's head is dragged. The second section of the extension is electrically isolated from the first section of the main or first section of the trough. The second section is provided with a low AC voltage of around 30 volts while the grid of the first section or main portion of the trough is provided with 15 to 30 volts of pulsating DC.

DETAILED DESCRIPTION OF THE INVENTION

Figure 1:
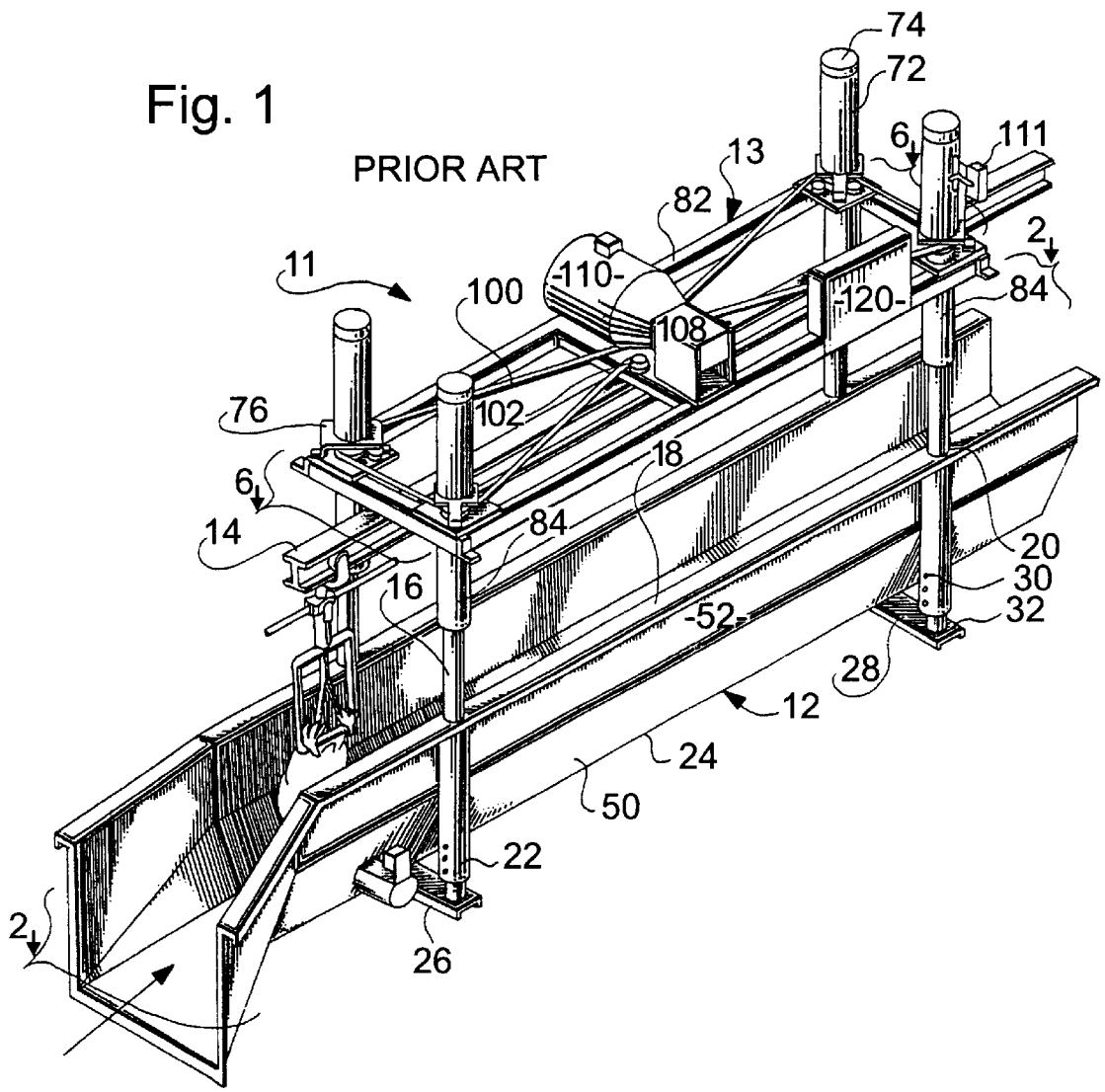
FIG. 1 is a perspective view of the stunner of the present invention.

Turning to the drawing FIG. 1 depicts the present invention stunner for poultry. Reference numeral 11 refers to the elongated trough 12 in which is supplied a quantity of a saline solution which is the electrolyte. Above the trough 12 is a carriage 13. It will be seen that the carriage is secured to in centered straddle fashion a conventional I-beam 14, not a part of the invention. Under normal operating circumstances the lower member of the I-beam carries equispaced rollers from which depend shackles connected by an endless driven cable, shown diagrammatically. The shackles are conventional and well known in the art and are detailed to hold the feet of a to be butchered poultry such as a chicken, turkey and the like. In other words the bird proceeds through the stunner in a vertical upside down position in a direction as depicted by the arrow.

The carriage 13 is mounted on four non-electrically conducting tubes 16. The trough 12 has a horizontally outwardly extending flange 18 at either side thereof.

The said flanges 18 has four openings 20 through which said tubes 16 extend thereinto. Depending integral from each of the openings 20 at the underside of the flanges 18 are co-equal in length in each case a tube 22. The said non-electrically conducting tubes 16 extend to a plane essentially even with the bottom 24 of the trough and a pair of a forward set of tubes 16 terminate with connecting cross-piece 26 and the rearward set of tubes 16 terminate with a like constructed cross-piece 28. The said trough rests on said cross-pieces 26, 28 either directly or through gross location means.

The gross location means is achieved by matching the appropriate location holes 30 in tube 22 with location holes 32 in non-electrically conducting tubes 16. In this manner with distance between the I-beam 14 and the trough may be grossly located to accommodate the operation such as turkeys or smaller birds such as chickens or a change in the gross distance may be necessary with the use of different length shackles. Of course, as was stated heretofore a further control distance between the I-beam and the trough will be achieved by moving the trough 12 up or down by the operation of the carriage 13.

Before discussing the component details with regard to the carriage 13 and the operation thereof, it is propitious to discuss in further detail the nature of the trough. In respect thereto, attention is now directed to not only FIG. 1 but this figure should also be considered with FIGS. 2, 3 and 4.

Figure 4:
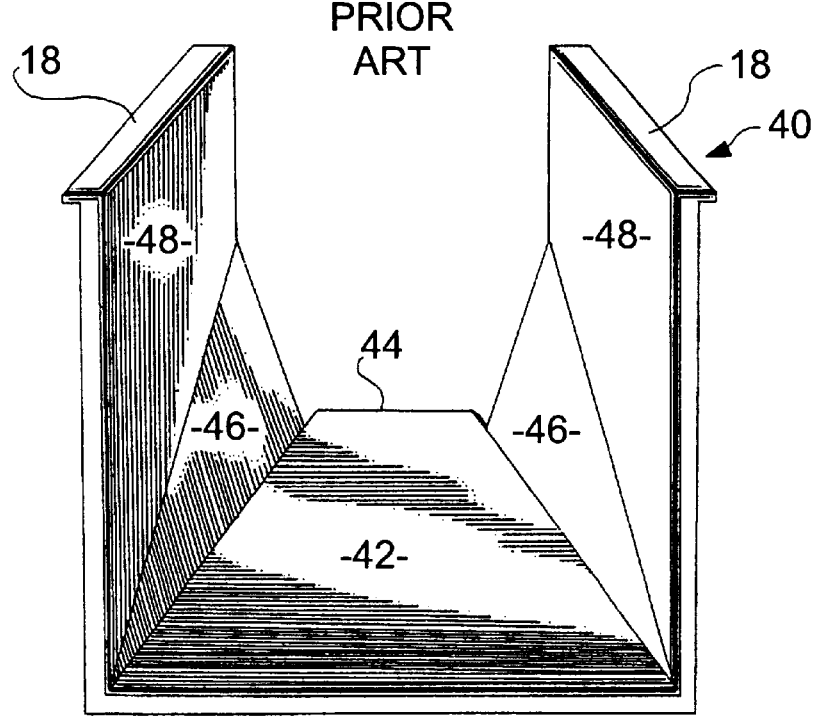
FIG. 4 is a closeup of the entrance portion of the trough.
Figure 5:
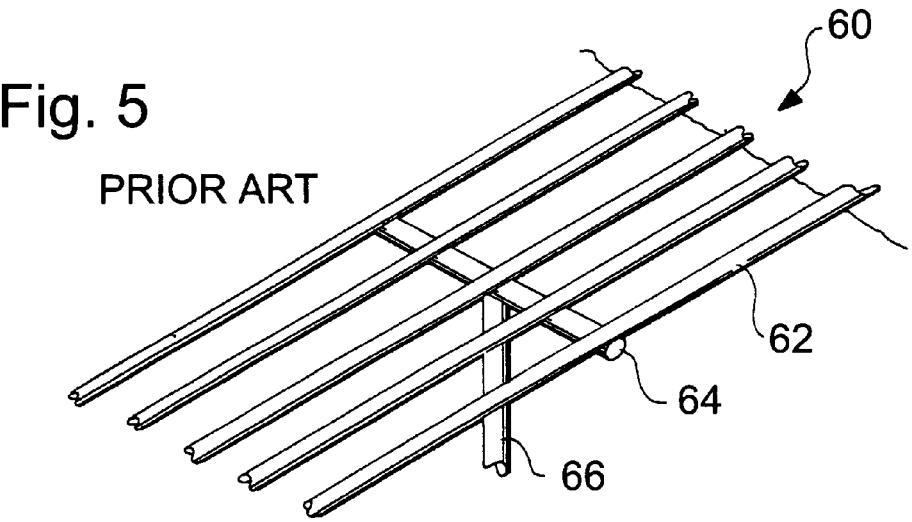
FIG. 5 is an enlarged perspective of a portion of the grid.
Figure 6:
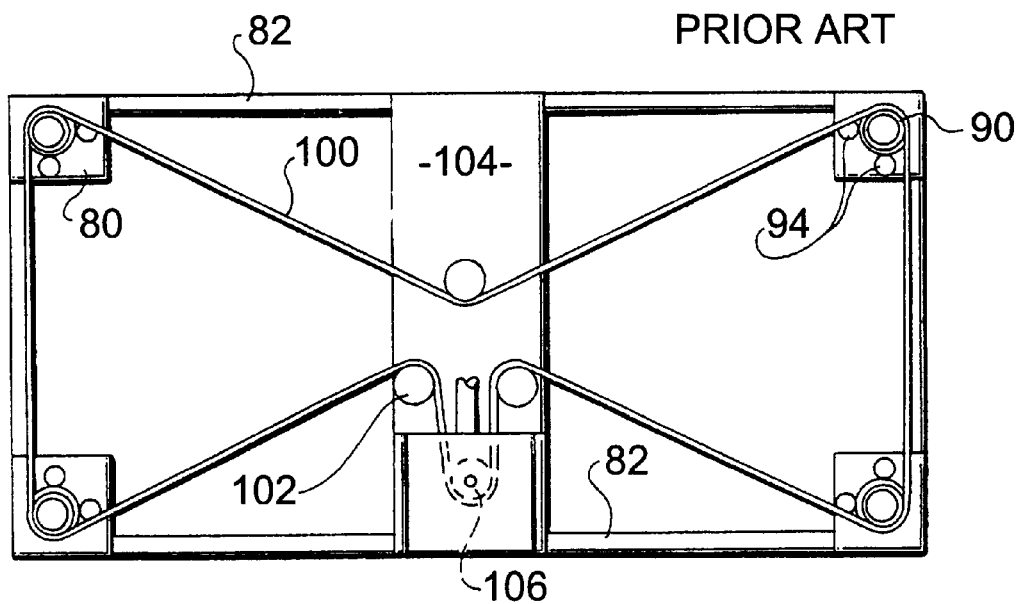
FIG. 6 is a top plan view of a plant 6—6 of FIG. 1 showing the carriage.
Figure 7:
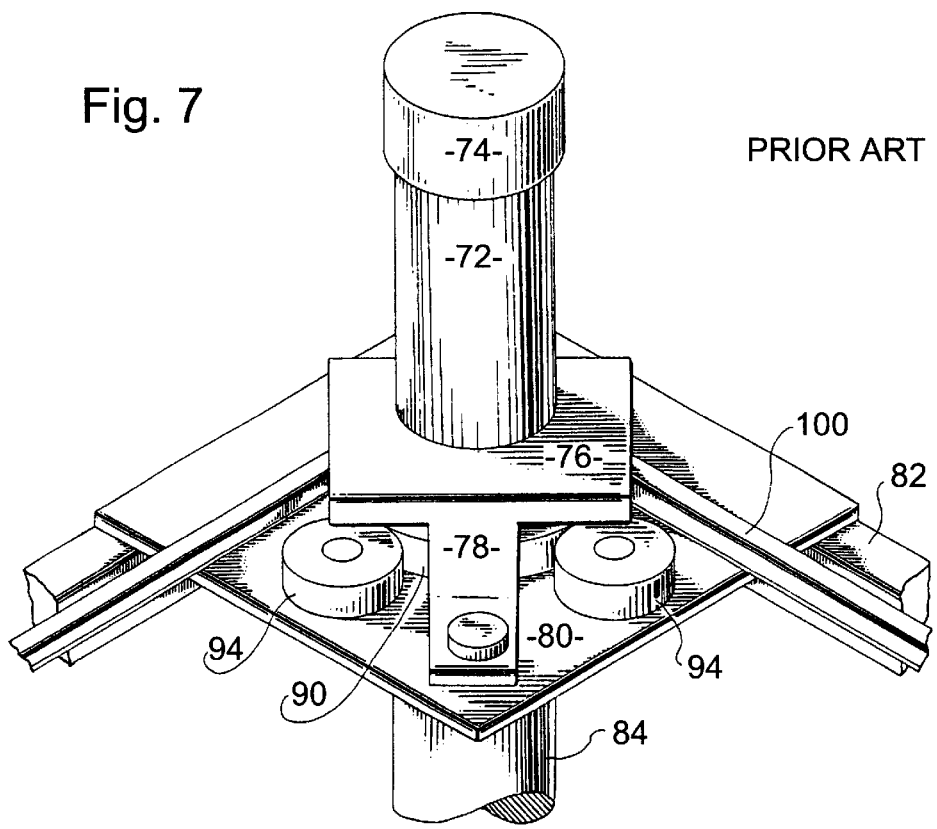
FIG. 7 is a perspective of one corner portion of the carriage.
Figure 8:
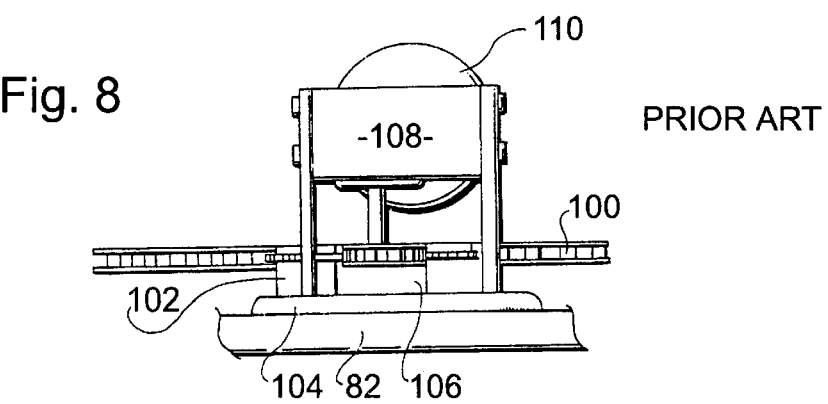
FIG. 8 is a side view of a central portion of the carriage.

The trough 12 has at its ingress portion a funnel arrangement 40, which can be seen in a greater degree of particularity in FIG. 4. The funnel narrows in the direction of the remainder of the trough 12. The funnel arrangement is covered with a polymeric elastomer of a non-electrically conducting material such as polypropylene whereby non electrically conducting pathway to the bird can be achieved.

Figure 3:
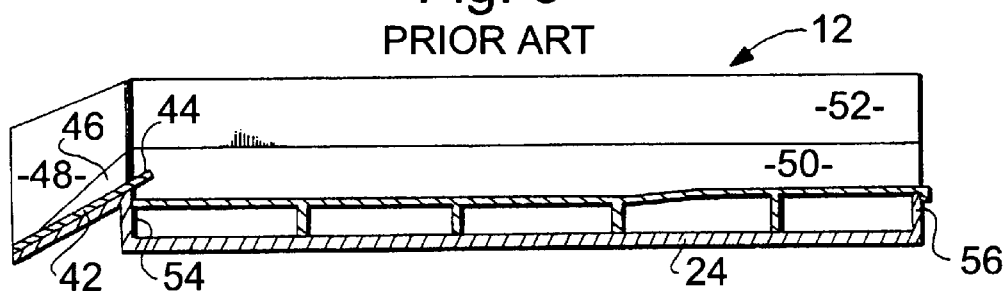
FIG. 3 is a cross-sectional view of the trough taken along lines 3—3 thereof of FIG. 2.

The funnel arrangement 40 has an upwardly inclined floor 42 having a trapezoidal configuration extending to produce a lip portion 44 extending over a portion of the saline containing portion of the trough (see FIG. 3). The side walls of the funnel arrangement 40 has side walls consisting of lower triangular portion 46 and upper trapezium portion 48. It has been discussed that dimensional ratios are useful in carrying out the precepts of the invention. The leading edge of the bottom 42 of the funnel arrangement may be about 18 inches; the axial length of about 18 inches is appropriate. The floor 42 should have a diminished width of only 5 inches and the lip 44 should extend axially about three inches.

The main body of the trough has a bottom 24 some what constricted with regard to the more spaced side walls made up of elongated horizontal portions 50 and 52, the latter the uppermost portion. The distance of the walls 50 from each other where the lip 44 enters the saline solution area is about 5 inches and the lip has an over lay thereinto of about three inches. The distance between both of walls 50 where they join with horizontal walls 52 may be about 10 inches. Wall 52 slants whereby at its upper terminus it is about 11 inches. The saline electrolyte containing portion of the trough is defined by upstanding front wall 54, end wall 56, the lower portion of side walls 50 and the bottom 24. The upper portion of egress end of the trough 12 does not possess a wall as the birds after being stunned pass out of the trough between the upper portion of said walls 50 and side walls 52.

Note from FIG. 1 that a port is provided through the forward end of said wall 50 through which a combination liquid level sensor and saline make-up fluid connector 58 is positioned. One side of the line electrical connection may be made therethrough.

Figure 2:
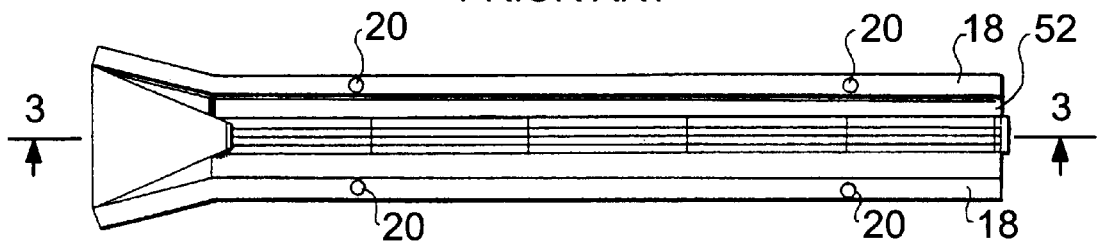
FIG. 2 is a top plane view of the trough as seen from a plane 2—2 of FIG. 1.

It will be noted from FIG. 2 that the saline containing portion of the trough is supplied with a grid 60 which is wetted with saline for most of its length. It consists of elongated metal rods 62 or perforated stainless steel plate as an alternative held together by approximately equidistantly disposed cross rods 64. Centrally located of each cross rod is a downwardly disposed rod 66 which acts as a leg to partially support the grid which is also supported by sloping sidewalls 50. The front end of the grid extends below the lip 44 and extends to an end consisting of a depending flange 68 suitably welded to connect the elongated rods 62. The flange has holes therethrough (not shown) which are adapted and constructed to be in alignment with holes in end wall 56 whereby the grid 60 may be bolted to the end wall 56.

From FIG. 3 it will be noted that the grid 60 slopes upwardly at the end of the trough. The slope is sufficient to be of a height taking it out of immersion in the saline solution.

Having described the trough 12 it is pointed out that stunning of the bird occurs continuously while the head and neck is in contact with the stainless steel surface. The dimensions of the elongated portion of the trough are such that the bird may get successive stunning shockers during its course through the trough 12 i.e. of about 7 seconds duration. Furthermore by having a sloping out of the sale solution portion of grid 60, as depicted in the above, the bird's head is prevented from touching the saline solution thereby permitting and achieving some draining of the excess saline solution from the bird. By this arrangement the need for make-up saline solution is somewhat diminished.

Having discussed the configuration of the trough in sufficient detail to provide good elucidation, attention is now directed to FIGS. 6, 7, 8 and 9 which should also be taken conjunction with FIG. 1.

The carriage 13 is adapted and constructed to provide the equivalent of fine tuning, i.e. to achieve approximately a seven and one half inch movement in any direction so that the trough is moved closer or further away by said dimensional amount As was stated in the above, the carriage is mounted on four non-electrically conducting tubes 16. Each of the tubes terminate the top with an elongated threaded portion 70 as can best be seen from FIG. 9. Each of the threaded portion 70 is surrounded by a metal tube 72 which has a plastic cap 74 having a cup configuration. The tube is mounted on a plate 76 which has an opening therethrough through which the threaded portion extends. The plate 76 has two flanged legs and feet 78 and is mounted in spaced relationship between a plate 80 mounted at each corner of a rectangularly disposed frame 82. The plate 80 has depending therefrom a tube 84 as can be seen from FIGS. 1, 7 and 9. The plate 80 has an appropriate opening whereby the threaded portion 70 aforementioned may pass therethrough. Sandwiched between plate 76 and plate 80 is a gear 90 having a threaded bore therethrough adapted and constructed to be in threaded engagement with the threaded portion 70. The gear 90 has a lower enlarged annular portion 92 adapted to be thrust against spaced journalled rollers 94. The central portion of the gear is gear teeth 96 and the upper portion of the gear 90 has another annular portion 98 of smaller diameter than portion 92.

An endless gear tooth accepting chain 100 passes around and meshes with the teeth portion 96. As similar elements are located in each corner as can be seen from FIG. 6, especially, the endless chain is clearly seen passing around each of the gears 90 and around idler toothed gears 102 which are mounted on cross piece 104 which in turn is mounted on the frame 82 as noted in FIG. 6. The chain 102 is driven by toothed gears 106 which is driven from a conventional gear and speed reduction box 108 manual crank or hydraulic motor of conventional construction. The gear box is in turn is operatively connected to an electrical reversible motor 110. When the motor operates the chain is driven in one selected direction. As the chain moves each of gears 90 is rotated and as a result of being in threaded engagement which the threaded portion 70 at each of the corners of the carriage 13 the entire carriage 13 moves uniformly upwardly or downwardly on said threaded portions 70. As the tubes 16 has affixed thereto the said trough 12 the trough is moved up or down in response to the positioning of gear 90 on the threaded portion 70 of the tubes 16 and therewith the distance between the trough and the I-beam may be varied a selected distance in the manner and for the reason aforementioned.

Figure 9:
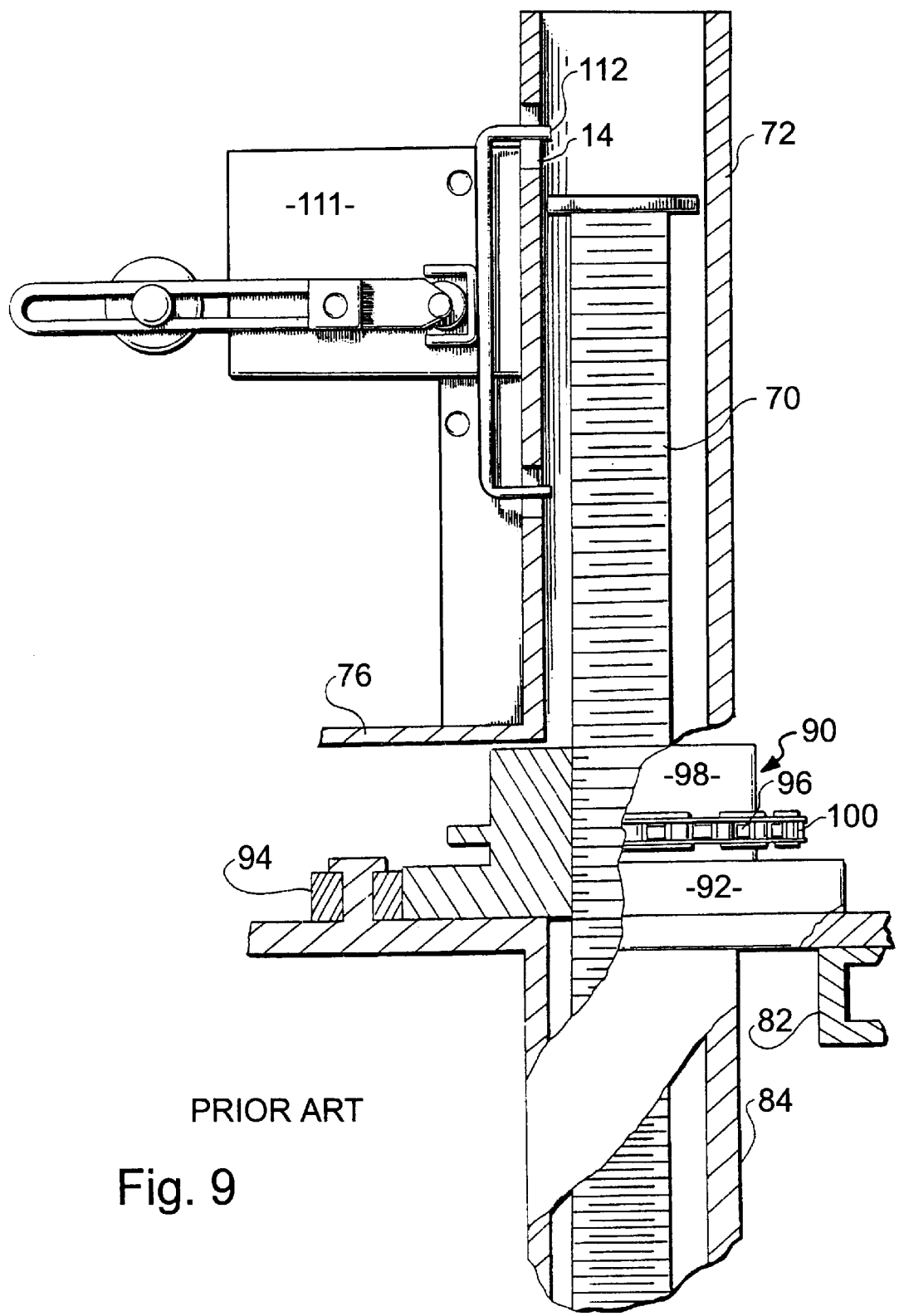
FIG. 9 is a cross-sectional view of one of the corners of said carriage.

In order to prevent an undesirable parameter of movement, in the case of electrical drive motor a limit switch 111 is employed as seen in FIG. 1 with a more detailed depiction by FIG. 9. The limit switch is of a conventional type. It is suitably mounted to one of the tubes 72 and is depicted in some what diagrammatic form in FIG. 9. Suffice to said that the upper and lower levers 112 of the actuating means protrude in appropriately located upper and lower opening 114. The tripping means is in the form of a disc 116 mounted at the end of a single threaded portion 70 and has a diameter somewhat more than threaded portion 70 whereby it extends radially therefrom and comes into either of the upper or lower levers 1 12 depending upon the direction of movement whereby the limit switch 111 interrupts the electricity supplied to the motor 110.

The limit switch is supplied with conventional adjustable weight balanced means to adjust the degree of upset needed to operate the switch. An electric switch housing 120 is mounted in the frame 81. An electric connection is also supplied to a suitable electric conducting pathway whereby electricity is supplied to the shackles carrying the birds of a polarity opposite to the polarity of the electricity being supplied to the stainless steel surface submersed in saline solution and the trough 12. The voltage need not be greater than 50, as a matter of fact it works quite well as considerable lower voltages. The electricity is D.C. oriented but is pulsating having a square ware form. The lower voltages are desirable in order to avoid work place injuries and carcass damage to the stunned poultry.

Figure 10:
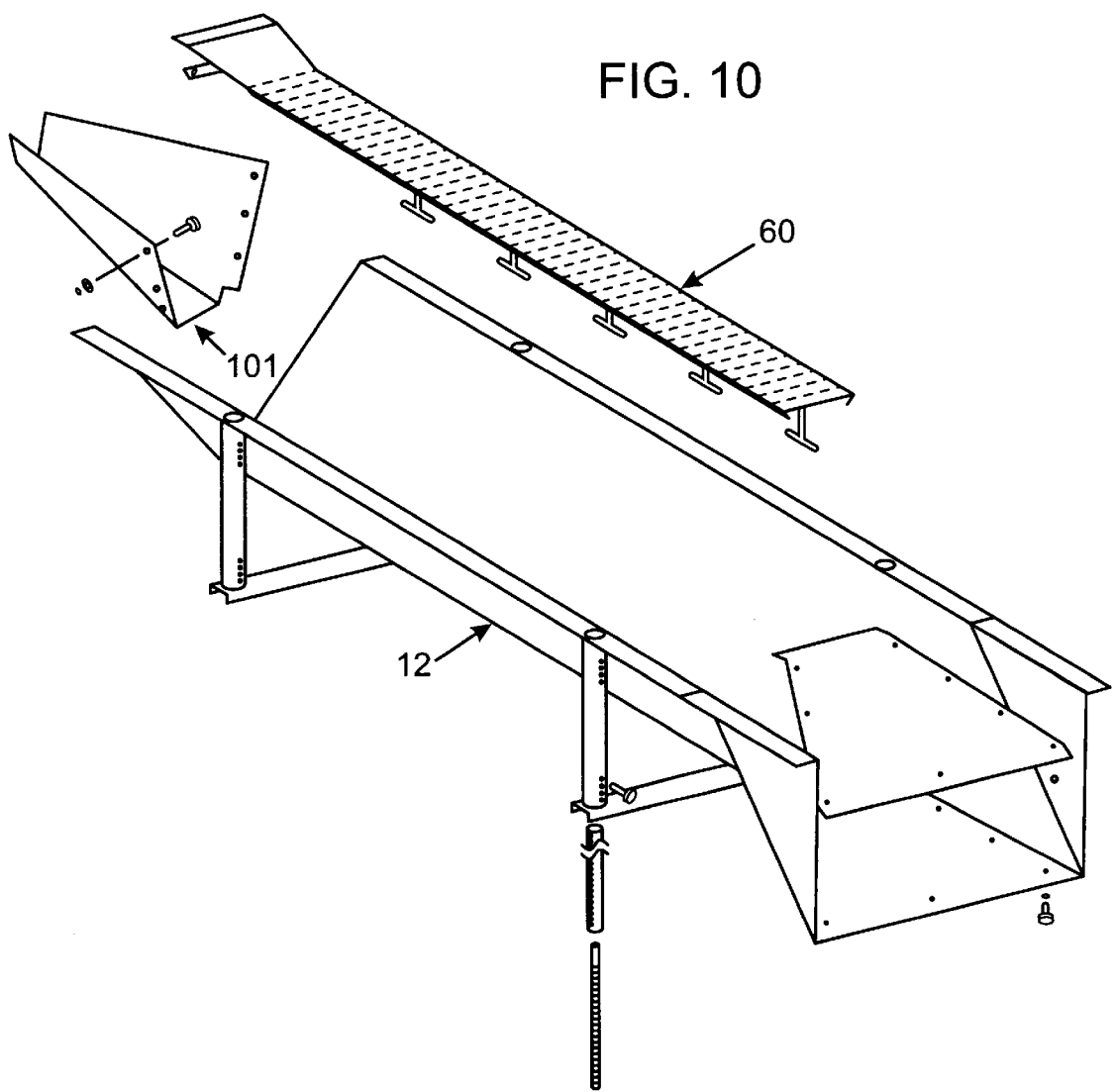
FIG. 10 is an exploded perspective view of trough with a grid showing the extension of the trough bolted thereto, the extension not having a grid.

Attention is now directed to FIG. 10 which shows the stainless steel extension 100 bolted onto the main trough 12 to give a first section and a second section. As the bottom 101 of the extension is slightly vertically displaced from the bottom 24 of the main trough the grid has a distal ramp end portion that is essentially at the same level as bottom 101. In operation, the bird is moved parallel to the grid 60 with the head of the poultry along its surface in the first section and then onto the bottom surface of the second section formed of the extension 100. The extension is electrically isolated from the main trough or first section. As stated, the first section is operated at between about 15 to 30 volts pulsating DC while the second section constituting the affixed extension is operated at above 30 volts AC, but at a low voltage. The speed of the conveyer is such that the birds are subjected to the low AC voltage in the second section for a period of only about two to three seconds.

What is claimed is:

1. A method for processing poultry, said method including;

(a) moving poultry in a defined path along a conveyor and into engagement with first and second electrodes of a first shocking area;

(b) applying an electrical potential difference to said first and second electrodes of between about 10 to 30 volts of pulsating DC current in said first shocking area;

(c) moving the said poultry into engagement with first and second electrodes of a second shocking area;

(d) applying an electrical potential difference to said first and second electrodes of above 30 volts of AC current in said second shocking area;

(e) moving the poultry through said shocking area.

2. A stunner for poultry and the like comprising a first section and second section elongated trough, the first section trough having a bottom, outwardly and upwardly flaring side walls and an end wall and an entrance, all defined to contain a relatively small quantity of an electrolytic solution, said end wall terminating with a lip means adapted and constructed to overlie said electrolytic solution, said entrance including an upwardly and inwardly sloping floor, said entrance also including inwardly and outwardly flared side walls, said end wall defining a relatively small height thereby permitting egress from said first section of said trough between said side outwardly and upwardly flaring walls, said first section of said trough having an elongated first horizontal grid spaced from the bottom thereof and sloping upwardly in the direction of said end wall whereby in use the portion of said grid which slopes upwardly is not immersed in said electrolytic solution, said grid being adapted and constructed to be electrically connected to a source of DC current, said trough is mounted to a plurality of upwardly extending means, said means terminating in upwardly extending-threaded means, a carriage means displaced vertically over said trough, means mounted on said carriage means adapted and constructed to operatively act on said threaded means, said threaded means mounted on said carriage means adapted and constructed to selectively rotate on said upwardly extending threaded means whereby said carriage means when said carriage means operates to increase or decrease distance between said trough and said carriage means, said second section trough being an elongate extension of said first section of said trough, said second section having upwardly flaring side walls, said second section of said trough having an elongated relatively smooth bottom adapted and constructed to be electrically connected to a source of AC current, said second section of said trough being electrically isolated from said grid.

* * * * *